United States Patent
Wang et al.

(10) Patent No.: US 10,977,337 B2
(45) Date of Patent: Apr. 13, 2021

(54) DETERMINING ACTIVE CONSTRAINTS IN NETWORK USING PSEUDO SLACK VARIABLES

(71) Applicant: Landmark Graphics Corporation, Houston, TX (US)

(72) Inventors: Qinghua Wang, Katy, TX (US); Graham Christopher Fleming, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 427 days.

(21) Appl. No.: 15/573,545

(22) PCT Filed: Nov. 4, 2016

(86) PCT No.: PCT/US2016/060539
§ 371 (c)(1),
(2) Date: Nov. 13, 2017

(87) PCT Pub. No.: WO2018/084850
PCT Pub. Date: May 11, 2018

(65) Prior Publication Data
US 2019/0213233 A1 Jul. 11, 2019

(51) Int. Cl.
*G06F 17/16* (2006.01)
*E21B 43/00* (2006.01)
(Continued)

(52) U.S. Cl.
CPC .............. *G06F 17/16* (2013.01); *E21B 43/00* (2013.01); *E21B 49/00* (2013.01); *G06F 30/20* (2020.01); *G06F 2111/10* (2020.01)

(58) Field of Classification Search
CPC ...... G06F 17/16; G06F 30/20; G06F 2111/10; E21B 43/00; E21B 49/00
See application file for complete search history.

(56) References Cited

U.S. PATENT DOCUMENTS 8,224,634 B2 7/2012 Watts et al.
8,600,717 B2 12/2013 Rashid et al.
(Continued)

FOREIGN PATENT DOCUMENTS

EP 0561492 A2 9/1993
EP 1358619 B1 11/2007

OTHER PUBLICATIONS

Watts, J. W., Fleming, G. C., & Lu, Q. (Jun. 1, 2012). Determination of Active Constraints in a Network. Society of Petroleum Engineers, doi: 10.2118/118877-PA.*

(Continued)

*Primary Examiner* — Saif A Alhija
*Assistant Examiner* — Peter Pham
(74) *Attorney, Agent, or Firm* — Tenley Krueger; Parker Justiss, P.C.

(57) ABSTRACT

A method for determining active constraint equations in a network of wells and surface facilities includes constructing at least one constraint equation for a connection in the network. Each constraint equation includes a respective slack variable and a respective slack variable multiplier. The method further includes constructing a base equation for the connection. The base equation includes the respective slack variable and another respective slack variable multiplier. The method further includes introducing a pseudo slack variable for another connection in the network such that a Schur complement, of a matrix of constraint and base equations dependent only on slack variable multipliers, is sparse. The method further includes solving for each respective slack variable using the Shur complement matrix. The method further includes adjusting a variable parameter of the network using results from solving for each respective slack variable.

20 Claims, 3 Drawing Sheets

(51) Int. Cl.
*E21B 49/00* (2006.01)
*G06F 30/20* (2020.01)
*G06F 111/10* (2020.01)

(56) References Cited

U.S. PATENT DOCUMENTS

2014/0149044 A1   5/2014  Allard et al.
2015/0134314 A1*  5/2015  Lu .......................... E21B 43/00
                                                       703/10

OTHER PUBLICATIONS

Bindel, Numerical Analysis (CS 4220), Feb. 17, 2016, pp. 1-16.*
International Searching Authority, Patent Cooperation Treaty, International Search Report and Written Opinion, International application No. PCT/US2016/060539, which is a PCT parent to the instant application, dated Jul. 18, 2017.
James W. Watts, Graham C. Fleming, Qin Lu, Society of Petroleum Engineers, Determination of Active Constraints in a Network, SPE Journal, vol. 17, Issue 02, Jun. 2012.

* cited by examiner

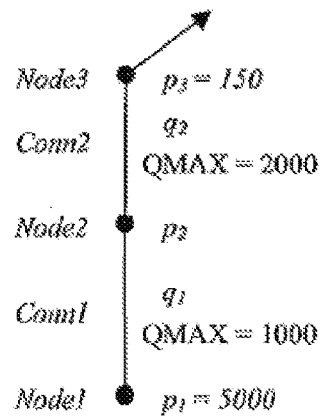
FIG. 1
FIG. 2
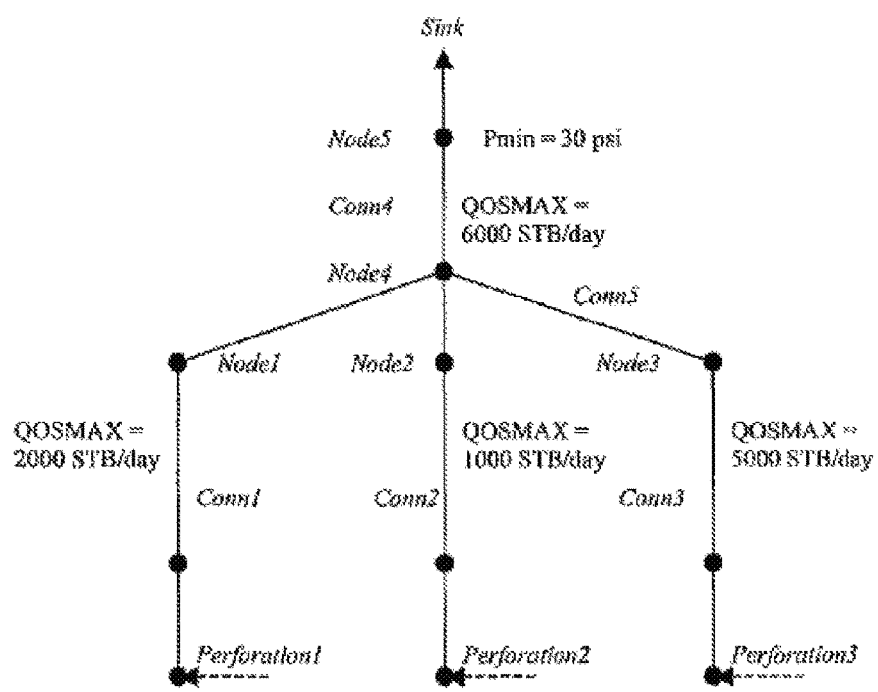

DETERMINING ACTIVE CONSTRAINTS IN NETWORK USING PSEUDO SLACK VARIABLES

BACKGROUND

In the oil and gas industry, a network of wells and surface facilities may be represented as sets of nodes, connections between different nodes, connections between nodes and reservoir grid cells (perforations), and connections between nodes and sinks (production) or sources (injection). A constraint is a physical limitation, often represented as a maximum or minimum threshold value, of a certain section of the network. For example, a connection between nodes may have a specific maximum rate at which fluid flows within the pipe that the connection represents.

One major difficulty in simulating how fluid flows within the network is determining which constraints are active because there may be hundreds, or perhaps thousands, of constraints that interact in various ways and with various dependencies. As such, a simple trial and error approach is prohibitively expensive because during simulation each trial would require factoring a large matrix. Moreover, certain constraints can be mutually incompatible resulting in an unsolvable singular matrix during simulation yielding inaccurate or incomplete data usually relied upon to make significant decisions.

BRIEF DESCRIPTION OF THE FIGURES

Accordingly, to mitigate or eliminate the problems identified above, systems and methods of determining active constraints in a network using pseudo slack variables are disclosed herein. In the following detailed description of the various disclosed embodiments, reference will be made to the accompanying drawings in which:

FIG. 1 is a diagram of an illustrative network section subject to constraints;

FIG. 2 is a diagram of an illustrative network of wells and a surface facility;

Figure 3:
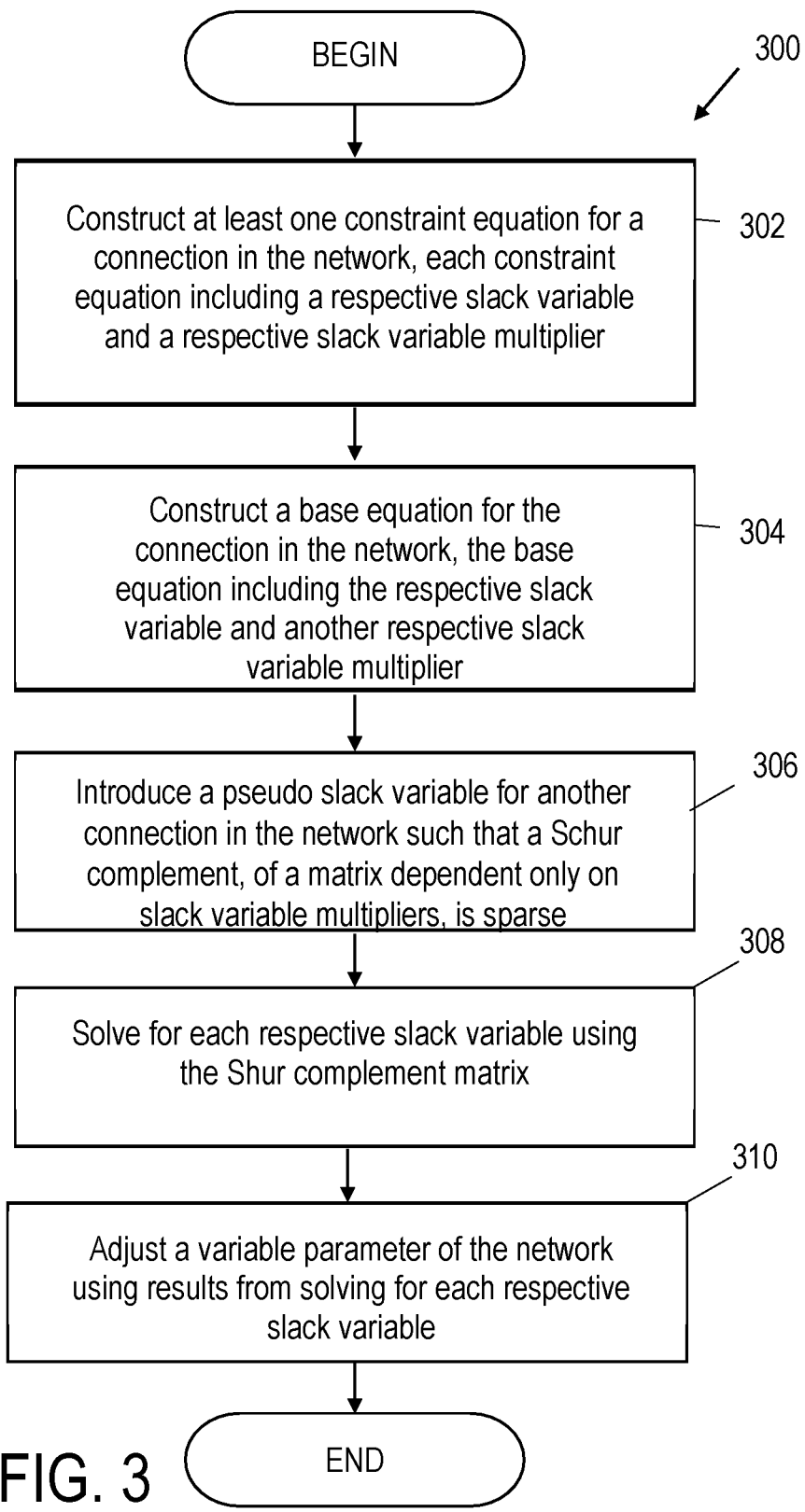
FIG. 3 is a flow diagram of an illustrative method of determining active constraints in a network using pseudo slack variables.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by systems and methods of determining active constraints in a network using pseudo slack variables. A pseudo slack variable is a variable introduced in the simulation equations that ensures sparsity of a particular matrix. Accordingly, the equations associated with the matrix will not reach an unsolvable state. Additionally, those equations will be computationally easier to solve and take less time to solve as well. FIG. 1 is a diagram of an illustrative network section subject to constraints. Different kinds of rate constraints may be applied to the connections (Conn1, Conn2) such as QOSMAX, which is a maximum oil phase rate constraint. A rate constraint may be enforced by a valve at the connection. Likewise, different kinds of minimum/maximum pressure constraints ($P_{min}/P_{max}$) may be applied to the nodes (Node1, Node2, Node3). The $P_{min}$ constraint at a node may be enforced by a valve at a downstream connection of the node, and the $P_{max}$ constraint may enforced by a valve at an upstream connection of the node.

A set of equations may be constructed to solve for the fluid flow in the connections and the pressures at nodes incorporating the constraints, but the connection equations may be written in many ways only one of which should be used. The chosen equation should not over-constrain the network because an unsolvable singular matrix will result. For example, the unknowns of the system of FIG. 1 are $q_1$, $q_2$, and $p_2$, representing the rate at Conn1, the rate at Conn2, and the pressure at Node2 respectively. While $p_1$ (pressure at Node1) and $p_3$ (pressure at Node3) are constants ($p_1=5000$, $p_3=150$). It is also assumed for this example, that the pressure drop between Node1 and Node3 is large enough that the two rate constraints will be violated when the valves at Conn1 and Conn2 are fully opened. The two rate constraint equations, which are chosen to be the connection equations at Conn1 and Conn2, and the mass balance equation at Node2 are, respectively:

$$q_1 = 1000 \quad (1)$$

$$q_2 = 2000 \quad (2)$$

$$q_1 - q_2 = 0 \quad (3)$$

The three equations are contradictory and cannot all be satisfied. Also, the pressure at Node2 is undetermined because this pressure does not appear in any of the equations. If the unknowns are ordered as $q_1$, $q_2$, $P_2$, then the system equation matrix becomes:

$$\begin{bmatrix} 1 & 0 & 0 \\ 0 & 1 & 0 \\ 1 & -1 & 0 \end{bmatrix} \quad (4)$$

which is singular and cannot be solved.

The QMAX constraint at Conn2 may be removed because its value is greater than the QMAX constraint at Conn1. In other words, the rate must be equal to or less than the smaller of the two QMAX constraints, which is QMAX=1000 at Conn1. The QMAX constraint at Conn2 (equation (2)) may be replaced by the hydraulics equation:

$$-p_2+p_3+b_2q_2+c_2=0 \qquad (5)$$

where $b_2$ and $c_2$ are constants determined by the hydraulics correlation. The network may now be solved because the matrix of the equation system:

$$\begin{bmatrix} 1 & 0 & 0 \\ 0 & 1 & 0 \\ 1 & b2 & -1 \end{bmatrix} \qquad (6)$$

is not singular.

A slack variable ensures that a constraint equation is always satisfied via its addition to the constraint equation. If the constraint is inactive, the slack variable "takes up the slack" by becoming the amount by which the inactive constraint equation as originally written is not satisfied. Slack variables are normally used in a group of inequality constraint equations, some of which are active. However, the equations typically come in pairs: a base equation applies if the constraint is inactive, and a constraint equation applies if the constraint is active. A slack variable is thus, added to the inactive equation and not to the active one. Accordingly, two multipliers are defined. A first multiplier modifying the slack variable is added to the base equation, and a second multiplier modifying the slack variable is added to the constraint equation. The multipliers are adjusted incrementally until one of the multipliers is zero and the other is one. The equation in which the multiplier is zero does not contain the slack variable and thus is active, while the equation in which the multiplier is one contains the slack variable and thus is inactive. The multipliers are computed as functions of a parameter (w). The first multiplier is set equal to (w) and the second is set equal to (1-w).

For example, the minimum pressure constraint equation is:

$$p_i = p_{min} \qquad (7)$$

where the subscript i refers to the inflow node for a connection. Using a process similar to that described above for the rate constraint, the introduction of the slack variable and multipliers result in:

$$\tfrac{1}{2}p_i(1-w_c)s_c = \tfrac{1}{2}p_{min} \qquad (8)$$

The base equation for this connection is the hydraulic equation, which for a 2 component system with the slack variable term added, has the form $$-cP_i + P_o + a_1q_1 + a_2q_2 + w_c s_c = d \qquad (9)$$

where the subscript i refers to the inflow node for the connection, the subscript o refers to the outflow node for the connection, a is a rate coefficient, and q is the mass flow rate, and the subscripts 1 and 2 indicate the component number. Here, factoring the network matrix costs much more than solving it once the factors are available because it must be refactored each time $w_c$ changes, which will be at each w iteration. This cost may be avoided by generating equations that contain $s_c$ but not $w_c$. Thus, eliminating $w_c$ in favor of $s_c$ yields:

$$-\tfrac{1}{2}p_i + p_o + a_1q_1 + a_2q_2 + s_c = d + \tfrac{1}{2}p_{min} \qquad (10)$$

The result is a partitioned matrix of the following form:

$$\begin{bmatrix} A_{xx} & A_{xs} \\ A_{sx} & A_{ss}(w) \end{bmatrix} \begin{bmatrix} x \\ s \end{bmatrix} = \begin{bmatrix} r_x \\ r_s \end{bmatrix} \qquad (11)$$

The unknown vector x contains the connection rates and node pressures; these are all of the unknowns other than the slack variables. The unknown vector s contains all of the slack variables. The sub-matrices $A_{xx}$ and $A_{xs}$ define node mass balance equations, hydraulics equations, and combined constraint-hydraulics equations. The sub-matrices $A_{sx}$ and $A_{ss}(w)$ define constraint equations. The sub-matrices $A_{xx}$, $A_{xs}$, and $A_{sx}$ do not contain any multipliers and thus do not depend on w. Only $A_{ss}(w)$ depends on w. The matrix equation (11) is reduced to a slack-only matrix using the Schur complement of $A_{ss}(w)$.

$$\tilde{A}_{ss}X_s = \tilde{R}_s \qquad (12)$$

$$\tilde{A}_{ss} = A_{ss} - A_{sn}A_{nn}^{-1}A_{ns} \qquad (13)$$

$$\tilde{R}_s = R_s - A_{sn}A_{nn}^{-1}R_n \qquad (14)$$

Again $\tilde{A}_{ss}$ is dependent on weight factors. After this reduced matrix is solved, a back solve is applied to find the solutions for other non-slack variables as follows:

$$\tilde{A}_{nn}X_n = \tilde{R}_n \qquad (15)$$

$$\tilde{R}_s = R_n - A_{ns}X_s \qquad (16)$$

However, $\tilde{A}_{ss}$ is a dense matrix, and considering thousands of slack variables are involved in the governing equations, the resulting Schur complement is expensive to solve.

As such, a pseudo slack variable is introduced. For example, the pseudo slack variable may be introduced in a set of base and constraint equations, thus increasing the number of rows and columns in the simulation matrices by one. The pressure unknown of nodes with a high ratio of connections may be selected as the pseudo slack variable. FIG. 2 describes the benefits of the introduction of the pseudo slack variable in a more detailed, but still relatively simple, example using three wells.

FIG. 2 is a diagram of an illustrative network of wells and a surface facility. The network has a tree-like structure, with each branch of the tree structure being a well. The wells join at a common gathering node, which is coupled to the surface facility. The surface facility may be a sink or source. A sink, such as a storage tank, receives hydrocarbons from the wells. A source delivers fluids, such as fracturing fluid or water, to the wells. For clarity of discussion, only three wells, one gathering node, and one surface facility are illustrated. However, in various embodiments any number of wells, gathering nodes, and surface facilities may be managed. Additionally, any number of wells may be coupled to a gathering node while another number of wells may be coupled to a different gathering node. Finally, some wells may be production wells (coupled to a sink), while other wells may be injection wells (coupled to a source).

Measured well data is collected regularly from each well to track changing conditions in the reservoir. These measurements may be taken using a number of different downhole and surface instruments or sensors, including but not limited to, temperature and pressure sensors, flow meters, and the like. Such measured data may be used to determine derived data. For example, derived data such as fluid flow rates, fluid compositions, and pressure distributions of the network may be solved with numerical models including a set of equations. The equations include mass balance equations at various nodes, hydraulic equations for each constraint, perforation equations, equations for specific variables such as maximum flow rate and source composition, and the like. A constraint is a physical limitation, often represented as a maximum or minimum threshold value, of a certain section of the network. Constraints include, but are not limited to, a water production flow rate limit, an oil production flow rate limit, a gas production flow rate limit, a fluid pressure limit, a liquid injection flow rate limit, a gas injection flow rate limit, and the like.

Three production wells (Conn1, Conn2, and Conn3) connect to a gathering node (Node4), which is eventually connected to a sink. In addition, there are four QOSMAX (maximum oil phase rate constraint at a surface condition) constraints at Conn1, Conn2, Conn3, and Conn4, and a $P_{min}$ (minimum pressure) constraint at Node5. There are five constraints in total. However, because the $P_{min}$ constraint at Node5 works as a boundary condition and it must be satisfied, only four slack variables are needed for the remaining four constraints, each associated with a w in the equations.

In this example, S1 is the constraint associated with Conn1, S2 is the constraint associated with Conn2, and the like. Accordingly, the dense Schur complement matrix for this example, calculated as described above, is:

$$\begin{bmatrix} S1 & a12 & a13 & a14 \\ a21 & S2 & a23 & a24 \\ a31 & a32 & S3 & a34 \\ a41 & a42 & a43 & S4 \end{bmatrix}$$

Factorization of this matrix is the most expensive calculation during the solve. To determine the active constraints, the matrix changes each time the weight factor changes, which is on average seven to ten times. The operation count for factorization of a dense matrix is $O(N^3/3)$, where N is the dimension of the matrix, or the number of slack variables in this case. By introducing a pseudo slack variable, the operation count of factorization is $O(2N)$ because the Schur complement matrix is sparse or less dense:

$$\begin{bmatrix} S1 & 0 & 0 & 0 & b1 \\ 0 & S2 & 0 & 0 & b2 \\ 0 & 0 & S3 & 0 & b3 \\ 0 & 0 & 0 & S4 & b4 \\ a1 & a2 & a3 & a4 & Sp \end{bmatrix}$$

For example, the pseudo slack variable may be introduced in a set of base and constraint equations, thus increasing the number of rows and columns in the simulation matrices by one. The new Schur complement matrix is much easier and cheaper to solve, and such an advantage is more significant for large networks with many constraints. The cost of this benefit is only one extra unknown, the pseudo slack variable. As described, the pseudo slack variable was selected to be the pressure variable at a highly connected node, but other variables may be selected such as a target flow rate for a section of the network.

The fluid flowing in the network of FIG. 2 is modeled with a black-oil model, which consists of oil, gas, and water components. The reservoir condition is assumed to be constant during the network solve. Table 1 shows the slack variable index for each constraint.

TABLE 1

| Slack Variable Index | Constraint |
| --- | --- |
| 1 | QOSMAX constraint at Conn1 |
| 2 | QOSMAX constraint at Conn2 |
| 3 | QOSMAX constraint at Conn3 |
| 4 | QOSMAX constraint at Conn4 |

The initial value of each w is 0.5 and is adjusted according to the solution value for each corresponding slack variable after each solve iteration. The w values are checked at the end of each iteration and the solve is repeated if any w is neither zero nor one. At the last iteration, all w values are either zero or one.

According to the solution, the values of w for constraints at Conn1, Conn2, and Conn4 are one. Therefore, these constraints are active. The values of w for the constraint at Conn3 is zero, which means Conn3 and Conn5 are governed by their hydraulics equations. Checking the solution of the phase rates of the network, as partially listed in Table 2, confirms all constraints have been satisfied (not violated) properly.

TABLE 2

Solution of oil phase rates and node pressures of the network and corresponding constraint status.

| | | | |
| --- | --- | --- | --- |
| Oil phase rate at Conn1 | 2000 STB/day | w = 1 | Constraint active |
| Oil phase rate at Conn2 | 1000 STB/day | w = 1 | Constraint active |
| Oil phase rate at Conn3 | 3000 STB/day | w = 0 | Constraint inactive |
| Oil phase rate at Conn4 | 6000 STB/day | w = 1 | Constraint active |

Introduction of the pseudo slack variable provides various advantages for determining active constraints in a network including, but not limited to, improved reliability, efficiency, accuracy, and simulation speed. FIG. 3 illustrates how the pseudo slack may be implemented.

Figure 4:
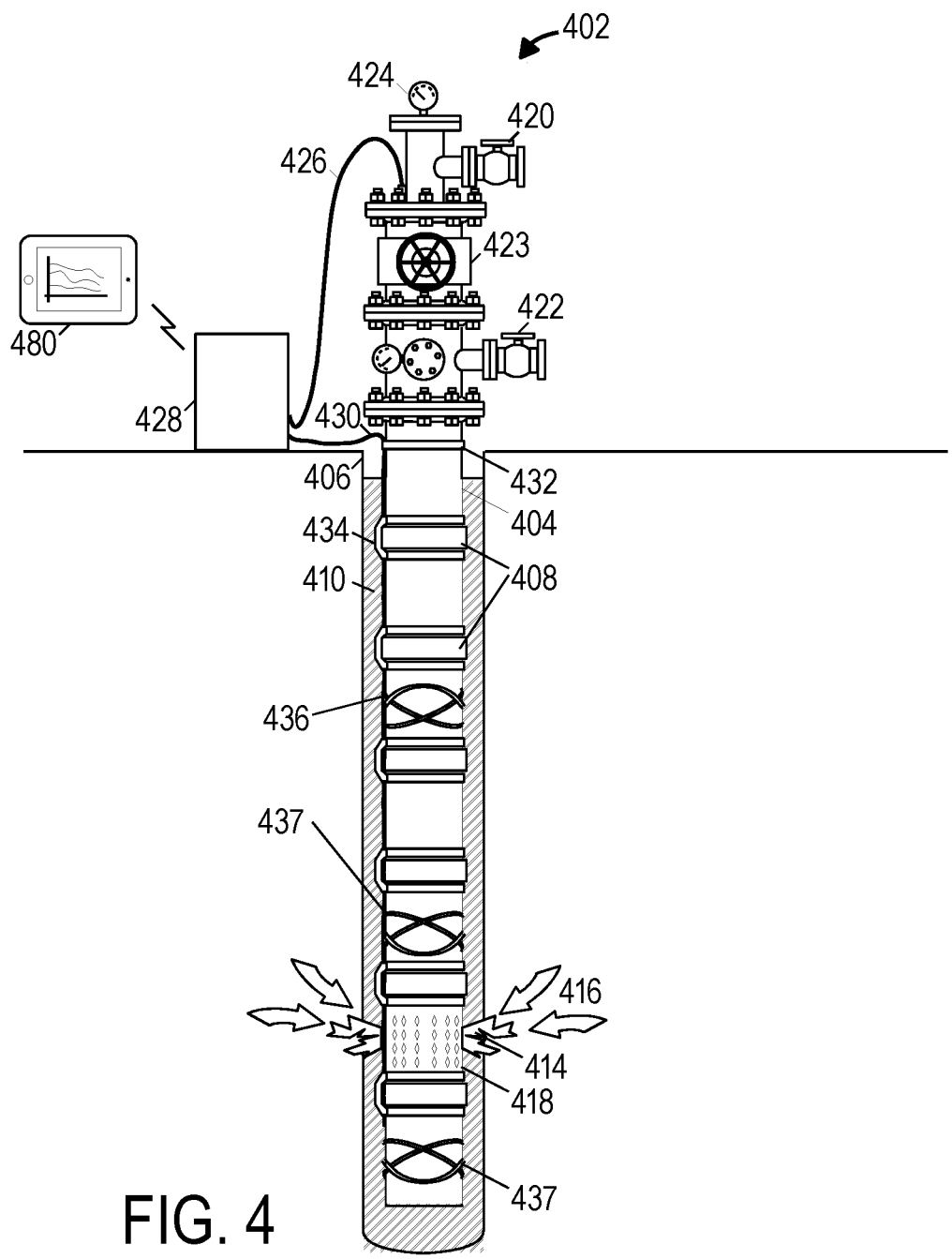
FIG. 4 is a contextual view of an illustrative production environment that may employ a system of determining active constraints in a network using pseudo slack variables.

FIG. 3 is a flow diagram of an illustrative method 300 for determining active constraint equations in a network of wells and surface facilities, such as those illustrated in FIGS. 1, 2, and 4, that may be performed at least in part by one or more processors coupled to memory. The memory may include instructions which, when executed by the one or more processors, cause the one or more processors to perform an action described below. The one or more processors may be part of a system 402 (described in the discussion of FIG. 4) that implements an action described below. The network may have a tree-like structure with at least one node shared by three or more connections. For example, a gathering node may be shared by three connections representing flow paths of a gathering/distribution pipe and at least two wells. The wells may be any combination of production wells and injection wells.

At 302, the system 402 constructs at least one constraint equation for a connection in the network. Each constraint equation includes a respective slack variable and a respective slack variable multiplier as described above. Many such equations may be constructed because of the many connections in typical networks.

At 304, the system 402 constructs a base equation for the connection. The base equation includes the respective slack variable and another respective slack variable multiplier as described above. Usually, only the base or constraint equation may be active at one time, and efficiently determining which equations are active for the many connections in the network results in significant advantages.

At 306, the system 402 introduces a pseudo slack variable for another connection in the network. For example, the pseudo slack variable may be introduced in another set of equations, thus increasing the number of rows and columns in the simulation matrices by one. The pseudo slack variable is selected such that a Schur complement, of a matrix of constraint and base equations dependent only on slack variable multipliers, $\tilde{A}_{ss}$ above, is sparse. For example, the Schur complement may be an arrow matrix. In other embodiments, the Schur complement is sparser than a dense matrix or a full matrix.

The pseudo slack variable may be associated with a pressure constraint, target flow rate, etc. on a node coupled to the associated connection. The upstream or downstream node of the associated connection may have a greater than average sum of input connections and output connections. Also, the pseudo slack variable may be selected to preserve a tree structure of an adjacency graph of the Schur complement. That is, if the network is mapped onto an adjacency graph, where adjacent nodes and connections are connected, the adjacency graph of the network in which a pseudo slack variable is introduced will be less complex and more tree-like in shape.

At 308, the system 402 solves for each respective slack variable using the Schur complement matrix described above. The method may further include adjusting each respective slack variable multiplier and each respective another slack variable multiplier between two predetermined values based on a solution for each respective slack variable. For example, the steps of solving for each respective slack variable and adjusting each respective slack variable multiplier and each respective another slack variable multiplier may be repeated until the at least one constraint equation or the base equation is determined to be active or inactive. The two predetermined values may be zero and one, and the constraint equation may be considered active if the value of the respective slack variable multiplier is equal to one. In various embodiments, other predetermined values and thresholds for activity may be used.

At 310, the system 402 adjusts a variable parameter of the network using results from solving for each respective slack variable. For example, the variable parameter may be enlarging or reducing a choke opening, shutting in wells, reopening wells, performing workovers, plugging perforations, shooting new perforations, changing tubing, drilling new wells, adjusting or adding artificial lift, adjusting gaslift rates, changing ESP power, switching wells to different separation systems, or adjusting downhole valves. Operating settings may be presented to the user, and in at least some embodiments may be used to adjust network settings manually. In other embodiments, at least some of the operating settings are transmitted to field equipment by the system 402 via telemetry to implement the modifications automatically, i.e. without human input. FIG. 4 illustrates such equipment in at least one embodiment.

FIG. 4 is a contextual view of an illustrative production environment that may employ a system 402 of managing a network of wells and surface facilities. A casing string 404 is positioned in a borehole 406 that has been formed in the earth by a drill bit, and the casing string 404 includes multiple casing tubulars (usually 30 foot long steel tubulars) connected end-to-end by couplings 408. Alternative casing types include continuous tubing and, in some rare cases, composite (e.g., fiberglass) tubing. Cement 410 has been injected between an outer surface of the casing string 404 and an inner surface of the borehole 406, and the cement 410 has been allowed to set. The cement 410 enhances the structural integrity of the well and seals the annulus around the casing 404 against undesired fluid flows. Though well is shown as entirely cemented, in practice certain intervals may be left without cement, e.g., in horizontal runs of the borehole where it may be desired to facilitate fluid flows.

Perforations 414 have been formed at one or more positions along the borehole 406 to facilitate the flow of a fluid 416 from a surrounding formation into the borehole 406 and thence to the surface. The casing string 404 may include pre-formed openings 418 in the vicinity of the perforations 414, or it may be perforated at the same time as the formation. Typically, the well is equipped with a production tubing string positioned in an inner bore of the casing string 404. One or more openings in the production tubing string accept the borehole fluids and convey them to the earth's surface and onward to storage and/or processing facilities via a production outlet 420. The wellhead may include other ports such as a port 422 for accessing the annular space(s) and a blowout preventer 423 for blocking flows under emergency conditions. Various other ports and feedthroughs are generally included to enable the use of external sensors 424 and internal sensors. A cable 426 couples such sensors to a well interface system 428.

The interface system 428 typically supplies power to the transducers and provides data acquisition and storage, possibly with some amount of data processing. A monitoring system is coupled to the interface system 428 via an armored cable 430, which is attached to the exterior of the casing string 404 by straps 432 and protectors 434. Protectors 434 guide the cable 430 over the collars 408 and shield the cable 430 from being pinched between the collar 408 and the borehole wall. The cable 430 connects to one or more electromagnetic transducer modules 436, 437 attached to the casing string 404. Each of the transducer modules 436, 437 may include a layer of nonconductive material having a high permeability to reduce interference from casing effects.

The EM transducer modules 436 can transmit or receive arbitrary waveforms, including transient (e.g., pulse) waveforms, periodic waveforms, and harmonic waveforms. The transducer modules 437 can further measure natural EM fields including magnetotelluric and spontaneous potential fields. Without limitation, suitable EM signal frequencies for reservoir monitoring include the range from 1 Hz to 10 kHz. In this frequency range, the modules may be expected to detect signals at transducer spacings of up to about 200 feet, though of course this varies with transmitted signal strength and formation conductivity. Higher signal frequencies may also be suitable for some applications, including frequencies as high as 500 kHz, 2 MHz, or more.

FIG. 4 further shows a processor unit 480 that communicates wirelessly with the well interface system 428 to obtain and process measurement data and to provide a representative display of the information to a user. The processor unit 480 is coupled to memory, which includes executable instructions that, when executed, cause the one or more processors to perform an action described above. The processor unit 480 may also communicate directly with the downhole environment. The processor unit 480 may take different forms including a tablet computer, laptop computer, desktop computer, and virtual cloud computer. The processor unit 480 may also be part of a distributed processing system including uphole processing, downhole processing, or both. Whichever processor unit embodiment is employed includes software that configures the unit's processor(s) to carry out an action described above and to enable the user to view and preferably interact with a display of the resulting information. In at least some illustrative embodiments, the above-described production system simulation is implemented in software that executes on a computer system, which in at least some illustrative embodiments implements at least part of the method 300 in FIG. 3.

In some aspects, systems, methods, and apparatuses for managing a network of wells and surface facilities are provided according to one or more of the following examples. In at least one embodiment, a method for determining active constraint equations in a network of wells and surface facilities includes constructing at least one constraint equation for a connection in the network. Each constraint equation includes a respective slack variable and a respective slack variable multiplier. The method further includes constructing a base equation for the connection. The base equation includes the respective slack variable and another respective slack variable multiplier. The method further includes introducing a pseudo slack variable for another connection in the network such that a Schur complement, of a matrix of constraint and base equations dependent only on slack variable multipliers, is sparse. The method further includes solving for each respective slack variable using the Schur complement matrix. The method further includes adjusting a variable parameter of the network using results from solving for each respective slack variable.

In another embodiment, a system may be used for determining active constraint equations in a network of wells and surface facilities. The network may be structured as a tree with at least one node shared by three or more connections. The connections may represent a one-dimensional flow path of a gathering/distribution pipe and at least two wells. The system includes one or more processors and memory coupled to the one or more processors. The memory includes executable instructions that, when executed, cause the one or more processors to construct at least one constraint equation for a connection in the network. Each constraint equation includes a respective slack variable and a respective slack variable multiplier. The one or more processors are further caused to construct a base equation for the connection in the network. The base equation includes the respective slack variable and another respective slack variable multiplier. The one or more processors are further caused to introduce a pseudo slack variable for another connection in the network such that a Schur complement, of a matrix constraint and base equations dependent only on slack variable multipliers, is sparse. The one or more processors are further caused to solve for each respective slack variable using the Schur complement matrix.

The following features may be incorporated into the various embodiments described above, such features incorporated either individually in or conjunction with one or more of the other features. The pseudo slack variable may be associated with a pressure constraint on a node coupled to the another connection, and the upstream or downstream node of the another connection may have a greater than average sum of input connections and output connections. The pseudo slack variable may be associated with a target flow rate for the another connection. The another connection may be downstream. The Schur complement may be an arrow matrix. The pseudo slack variable may preserve a tree structure of an adjacency graph of Schur complement. Each respective slack variable multiplier and each respective another slack variable multiplier may be adjusted between two predetermined values based on a solution for each respective slack variable. The steps of solving for each respective slack variable and adjusting each respective slack variable multiplier and each respective another slack variable multiplier may be repeated until the at least one constraint equation or the base equation is determined to be active or inactive. The two predetermined values may be zero and one. The constraint equation may be active if the value of the respective slack variable multiplier is equal to one. The variable parameter may be enlarging or reducing a choke opening, shutting in wells, reopening wells, performing workovers, plugging perforations, shooting new perforations, changing tubing, drilling new wells, adjusting or adding artificial lift, adjusting gaslift rates, changing ESP power, switching wells to different separation systems, or adjusting downhole valves. A variable parameter of the network may be automatically adjusted using results from solving for each respective slack variable.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method for determining active constraint equations in a network of wells and surface facilities, the network structured as a tree with at least one node shared by three or more connections, the connections representing one-dimensional flow paths of a gathering/distribution pipe and at least two wells, the method comprising:
constructing at least one constraint equation for a connection in the network, each constraint equation including a respective slack variable and a respective slack variable multiplier;
constructing a base equation for the connection in the network, the base equation including the respective slack variable and another respective slack variable multiplier;
introducing a pseudo slack variable for another connection in the network into a matrix of the at least one constraint and the base equations dependent only on slack variable multipliers such that a Schur complement of the matrix of the at least one constraint and base equations dependent only on slack variable multipliers with the pseudo slack variable introduced therein is made sparse by increasing a number of rows and columns in the Schur complement of the matrix of at least one constraint equation and base equations dependent only on slack variable multipliers with the pseudo slack variable introduced therein;
solving for each respective slack variable using the Schur complement matrix; and
adjusting a variable parameter of the network of wells and surface facilities using results from solving for each respective slack variable.

2. The method of claim 1, wherein the pseudo slack variable is associated with a pressure constraint on a node coupled to the another connection, and the upstream or downstream node of the another connection has a greater than average sum of input connections and output connections.

3. The method of claim 1, where the pseudo slack variable is associated with a target flow rate for the another connection.

4. The method of claim 1, wherein the another connection is downstream.

5. The method of claim 1, wherein the Schur complement is an arrow matrix.

6. The method of claim 1, wherein the pseudo slack variable preserves a tree structure of an adjacency graph of Schur complement.

7. The method of claim 1, further comprising:
adjusting each respective slack variable multiplier and each respective another slack variable multiplier between two predetermined values based on a solution for each respective slack variable; and
repeating the steps of solving for each respective slack variable and adjusting each respective slack variable multiplier and each respective another slack variable multiplier until the at least one constraint equation or the base equation is determined to be active or inactive.

8. The method of claim 7, wherein the two predetermined values are 0 and 1.

9. The method of claim 8, wherein the constraint equation is active if the value of the respective slack variable multiplier is equal to 1.

10. The method of claim 1, wherein the variable parameter is selected from the group consisting of: enlarging or reducing a choke opening, shutting in wells, reopening wells, performing workovers, plugging perforations, shooting new perforations, changing tubing, drilling new wells, adjusting or adding artificial lift, adjusting gaslift rates, changing ESP power, switching wells to different separation systems, and adjusting downhole valves.

11. A system for determining active constraint equations in a network of wells and surface facilities, the network structured as a tree with at least one node shared by three or more connections, the connections representing one-dimensional flow paths of a gathering/distribution pipe and at least two wells, the system comprising:
one or more processors;
memory coupled to the one or more processors;
the memory comprising executable instructions that, when executed, cause the one or more processors to:
construct at least one constraint equation for a connection in the network, each constraint equation including a respective slack variable and a respective slack variable multiplier;
construct a base equation for the connection in the network, the base equation including the respective slack variable and another respective slack variable multiplier;
introduce a pseudo slack variable for another connection in the network into a matrix of the at least one constraint and base equations dependent only on slack variable multipliers such that a Schur complement of the matrix of the at least one constraint and base equations dependent only on slack variable multipliers with the pseudo slack variable introduced therein is made sparse by increasing a number of rows and columns in the Schur complement of the matrix of at least one constraint and equations dependent only on slack variable multipliers with the pseudo slack variable introduced therein;
solve for each respective slack variable using the Schur complement matrix; and
adjust a variable parameter of the network of wells and surface facilities using results from solving for each respective slack variable.

12. The system of claim 11, wherein the pseudo slack variable is associated with a pressure constraint on a node coupled to the another connection, and the upstream or downstream node of the another connection has a greater than average sum of input connections and output connections.

13. The system of claim 11, where the pseudo slack variable is associated with a target flow rate for the another connection.

14. The system of claim 11, wherein the another connection is downstream.

15. The system of claim 11, wherein the Schur complement is an arrow matrix.

16. The system of claim 11, wherein the one or more processors are further caused to automatically adjust the variable parameter of the network of wells and surface facilities using the results from solving for each respective slack variable.

17. The system of claim 11, wherein the one or more processors are further caused to:
adjust each respective slack variable multiplier and each respective another slack variable multiplier between two predetermined values based on a solution for each respective slack variable; and
repeat the steps of solving for each respective slack variable and adjusting each respective slack variable multiplier and each respective another slack variable multiplier until the at least one constraint equation or the base equation is determined to be active or inactive.

18. The system of claim 17, wherein the two predetermined values are 0 and 1.

19. The system of claim 18, wherein the constraint equation is active if the value of the respective slack variable multiplier is equal to 1.

20. The system of claim 11, wherein the variable parameter is selected from the group consisting of: enlarging or reducing a choke opening, shutting in wells, reopening wells, performing workovers, plugging perforations, shooting new perforations, changing tubing, drilling new wells, adjusting or adding artificial lift, adjusting gaslift rates, changing ESP power, switching wells to different separation systems, and adjusting downhole valves.

* * * * *